(12) United States Patent
Ishitoko et al.

(10) Patent No.: US 6,418,789 B1
(45) Date of Patent: Jul. 16, 2002

(54) VIBRATING GYROSCOPE

(75) Inventors: Nobuyuki Ishitoko, Toyama; Katsumi Fujimoto, Toyama-ken, both of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/499,957

(22) Filed: Feb. 8, 2000

(30) Foreign Application Priority Data

Feb. 26, 1999 (JP) ............................................. 11-049509
Feb. 26, 1999 (JP) ............................................. 11-049510

(51) Int. Cl.$^7$ ............................. G01C 19/02; G01P 3/44
(52) U.S. Cl. .................................................. 73/504.12
(58) Field of Search ........................ 73/504.12, 504.15, 73/570, 504.04, 662

(56) References Cited

U.S. PATENT DOCUMENTS

| | | | |
|---|---|---|---|
| 5,691,471 A | 11/1997 | Okazaki et al. | 73/504.041 |
| 5,894,090 A | * 4/1999 | Tang et al. | 331/158 |
| 5,998,911 A | * 12/1999 | Kikuchi et al. | 310/316.01 |
| 6,079,272 A | * 6/2000 | Stell et al. | 73/504.12 |
| 6,289,733 B1 | * 9/2001 | Challoner et al. | 73/504.04 |

FOREIGN PATENT DOCUMENTS

| | | |
|---|---|---|
| EP | 0735344 | 10/1996 |
| JP | 6333695 | 12/1994 |
| JP | 9073990 | 3/1997 |
| JP | 11014373 A | * 1/1999 |

OTHER PUBLICATIONS

Patent Abstracts of Japan, vol. 1999, Feb. 26, 1999 & JP 10 307028 A (Murata Mfg. Co., Ltd.), Nov. 17, 1998.

* cited by examiner

Primary Examiner—Hezron Williams
Assistant Examiner—Rose M. Miller
(74) Attorney, Agent, or Firm—Ostrolenk, Faber, Gerb & Soffen, LLP

(57) ABSTRACT

A vibrating gyroscope includes: a support; four vibrating arms, four weights and excitation and detection elements. Each of the four vibrating arms has a first end and a second end in a longitudinal direction, and the four vibrating arms are fixed to the support at the respective first ends in the longitudinal direction such that four vibrating arms are radially arranged in a single plane with the adjacent arms making an angle of about 90 degrees. The four weights are fixed to the support so as to be arranged radially between the respective adjacent vibrating arms. The excitation and detection elements vibrate the vibrating arms under a bending mode within the single plane and output signals generated by the vibration of the vibrating arms.

16 Claims, 18 Drawing Sheets

1

VIBRATING GYROSCOPE

BACKGROUND OF THE INVENTION

1. Field of the Invention

The present invention relates to a vibrating gyroscope, and more particularly to, for instance, a vibrating gyroscope used to detect rotational angular velocity for preventing shaking in a camera.

2. Description of the Related Art

FIG. 1 is a perspective view of an example of a conventional vibrating gyroscope. The vibrating gyroscope 1 comprises for instance a vibrator 2 in the shape of a rod having a triangular cross section. Piezoelectric elements 3a, 3b, and 3c are provided on the three side faces of the vibrator 2. To use the vibrating gyroscope 1, as for instance shown in FIG. 2, an oscillation circuit 4 is connected between the piezoelectric elements 3a, 3b, and 3c. Moreover, the piezoelectric elements 3a and 3b connect to a detection circuit 5. The detection circuit 5 comprises a differential amplifier, a synchronous detection circuit, a smoothing circuit, a dc amplifier circuit, and the like.

In this vibrating gyroscope 1, the output signal of the piezoelectric element 3c feeds back to the oscillation circuit 4. In the oscillation circuit 4, the fed back signal is amplified, and further phase-adjusted to produce an excitation signal. The excitation signal obtained in this manner is applied to the piezoelectric elements 3a and 3b. As a consequence, the vibrator 2 vibrates under a bending mode in a direction at a right angle to the face upon which the piezoelectric element 3c is located. In this state, the bending state of the piezoelectric elements 3a and 3b is the same, and their output signals are the same. Therefore, no signal is output from the differential amplifier of the detection circuit 5. When the vibrator 2 is vibrating under a bending mode, and rotates around the axis of the vibrator 2, the Coriolis force changes the vibration direction of the vibrator 2. Consequently, a difference is created between the signals output from the piezoelectric elements 3a and 3b, and the differential amplifier outputs a signal. This signal is detected by the synchronous detection circuit, smoothed by the smoothing circuit, and amplified by the dc amplifier circuit. Therefore, it is possible to detect the rotation angular velocity by measuring the output signal of the detection circuit 5.

Furthermore, as shown in FIG. 3, a vibrator comprising two piezoelectric substrates 6a and 6b joined together may be constructed as the vibrating gyroscope 9. As shown by the arrows in FIG. 3, these piezoelectric substrates 6a and 6b are polarized in reverse directions. In this case, electrodes 7a and 7b are provided on one face side of the vibrator 2 extending in the length direction thereof, and an electrode 8 is provided entirely over the other face side of the vibrator. In such a vibrating gyroscope 9, it is possible to detect the rotation angular velocity using the circuit shown in FIG. 2.

However, with these vibrating gyroscopes, it is only possible to detect rotation angular velocity around the axis of the vibrator, and it is only possible to detect angular velocity in one direction. Therefore, in order to detect the rotation angular velocity in two directions, two vibrating gyroscopes must be used, and two oscillator circuits must be provided to excite these vibrating gyroscopes. Such an oscillator circuit is expensive, raising the cost of detecting angular velocity in multiple directions.

For the forgoing reasons, there is a need for a vibrating gyroscope capable of detecting angular velocity in two directions with one element.

SUMMARY OF THE INVENTION

The present invention is directed to a vibrating gyroscope that satisfies this need. The vibrating gyroscope includes: a support; four vibrating arms, four weights and excitation and detection elements. Each of the four vibrating arms has a first end and a second end in a longitudinal direction, and the four vibrating arms are fixed to the support at the respective first ends in the longitudinal direction such that four vibrating arms are radially arranged in a single plane with the adjacent arms making an angle of about 90 degrees. The four weights are fixed to the support so as to be arranged radially between the respective adjacent vibrating arms. The excitation and detection elements vibrate the vibrating arms under a bending mode within the single plane and output signals generated by the vibration of the vibrating arms.

The excitation and detection elements cause the four vibrating arms to vibrate under a bending mode around the center member within the plane in which they are provided. At this time, since adjacent vibrating arms are arranged so as to intersect each other at right angles, the vibration of the vibrating arms acts as a force in the rotation direction on the entire structure. However, since the weights are provided between the vibrating arms, the weights vibrate in the reverse direction to the vibration direction of the vibrating arms, whereby a force acts in a direction to cancel the rotational force of the vibrating arms. When the vibrating gyroscope rotates around the axis of the vibrating arms, a Coriolis force changes the vibration direction of the vibrating arms, and a signal in correspondence with the Coriolis force is output from the excitation and detection element. Here, since the four vibrating arms are arranged so as to intersect at right angles, it is possible to obtain a signal in correspondence with an angular velocity for two directions intersecting at a right angle.

In this vibrating gyroscope, the excitation and detection elements may comprise piezoelectric elements having electrodes provided thereon, but the vibrating arms may themselves comprise the piezoelectric elements, and piezoelectric elements other than the vibrating arms can be used as the excitation and detection elements. That is, different constitutions of the excitation and detection elements can be realized wherein the excitation signal causes the vibrating arms to vibrate under a bending mode, and in addition, a signal in correspondence with the displacement of the vibrating arms can be output.

According to the present invention, one vibrating gyroscope is able to determine the angular velocity centered around axes in two directions. Moreover, the vibrating gyroscope can be excited using a single oscillation circuit, thereby enabling costs to be reduced to less than in conventional methods using two vibrating gyroscopes.

For the purpose of illustrating the invention, there is shown in the drawings several forms which are presently preferred, it being understood, however, that the invention is not limited to the precise arrangements and instrumentalities shown.

DETAILED DESCRIPTION OF PREFERRED EMBODIMENTS

Hereinafter, the preferred embodiments of the present invention are explained in detail with reference to the drawings.

Figure 4:
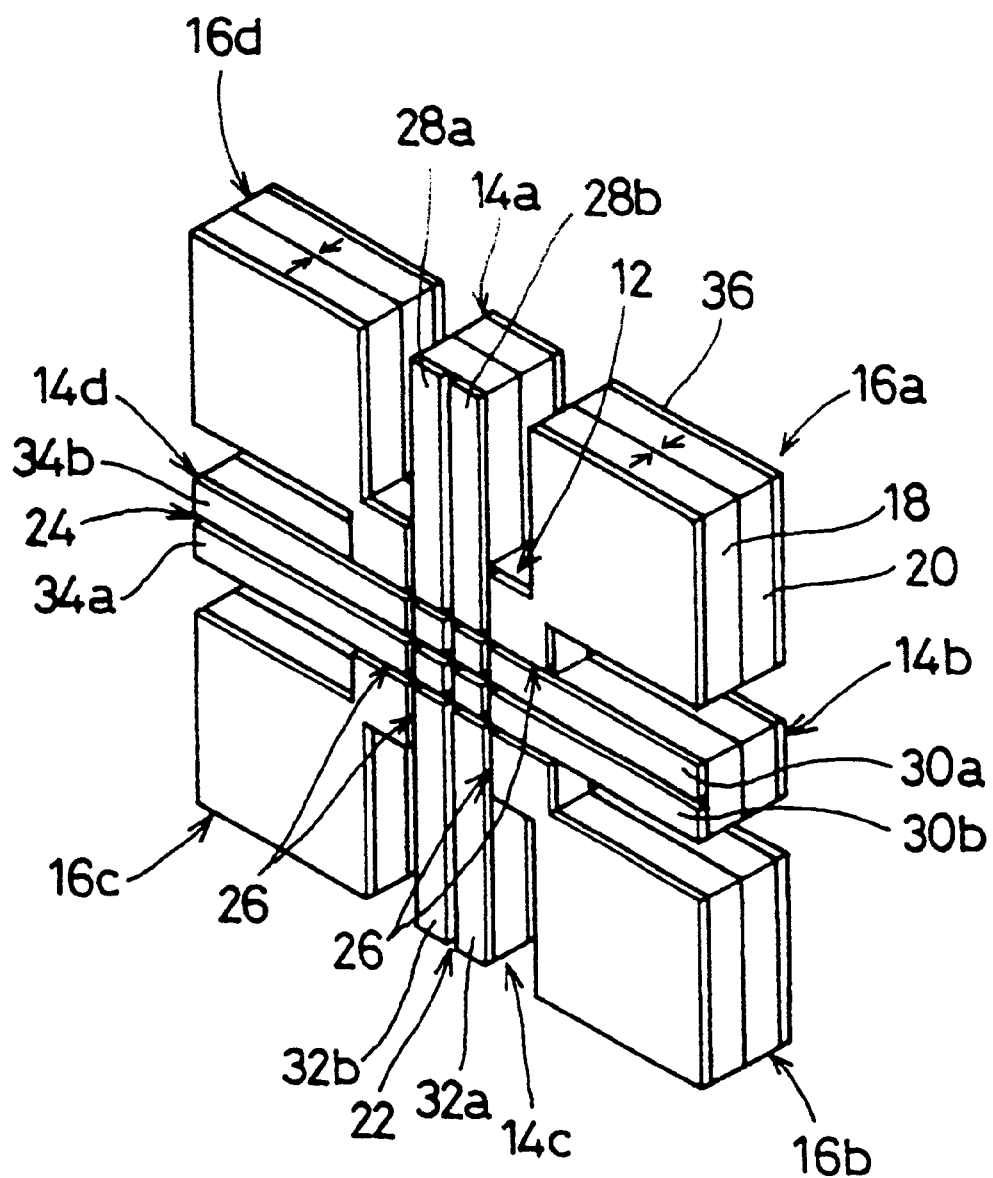
FIG. 4 is a perspective view as seen from a first side of an example of a vibrating gyroscope according to a first embodiment of the present invention.

FIG. 4 is a perspective view of an example of the vibrating gyroscope according to a first embodiment of the present invention. The vibrating gyroscope 10 comprises a center member 12 as a support. The center member 12 has, for instance, a square plane shape. Vibrating arms 14a, 14b, 14c, and 14d each having a first end and a second end in its longitudinal direction are provided on the same plane as the center member 12. Each of the vibrating arms 14a, 14b, 14c, and 14d has, for example, a rectangular parallelepiped shape. The vibrating arms 14a, 14b, 14c, and 14d are fixed to the center member 12 at respective first ends thereof such that the vibrating arms 14a, 14b, 14c, and 14d are radially arranged with the adjacent arms making an angle of 90 degrees. Thus, the second ends of the vibrating arms 14a, 14b, 14c, and 14d are arranged on the outside of the radial arrangement with respect to the first ends thereof, and the vibrating arms 14a, 14b, 14c, and 14d can vibrate on the side of the second ends, that is, on the outside of the radial arrangement.

Moreover, weights 16a, 16b, 16c, and 16d, having for instance, a square plane shape, are provided between the four vibrating arms 14a to 14d, respectively. The weights 16a to 16d are also fixed to the center member so as to be arranged radially. In this preferred embodiment, the center member 12, the vibrating arms 14a to 14d, and the weights 16a to 16d, are integrally formed.

Figure 1:
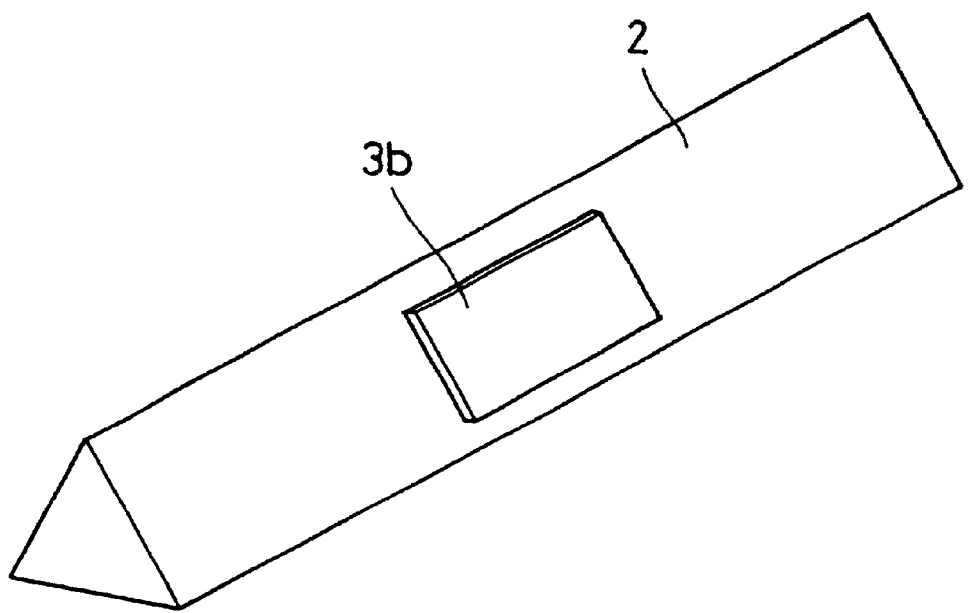
FIG. 1 is a perspective view of an example of a conventional vibrating gyroscope.
Figure 2:
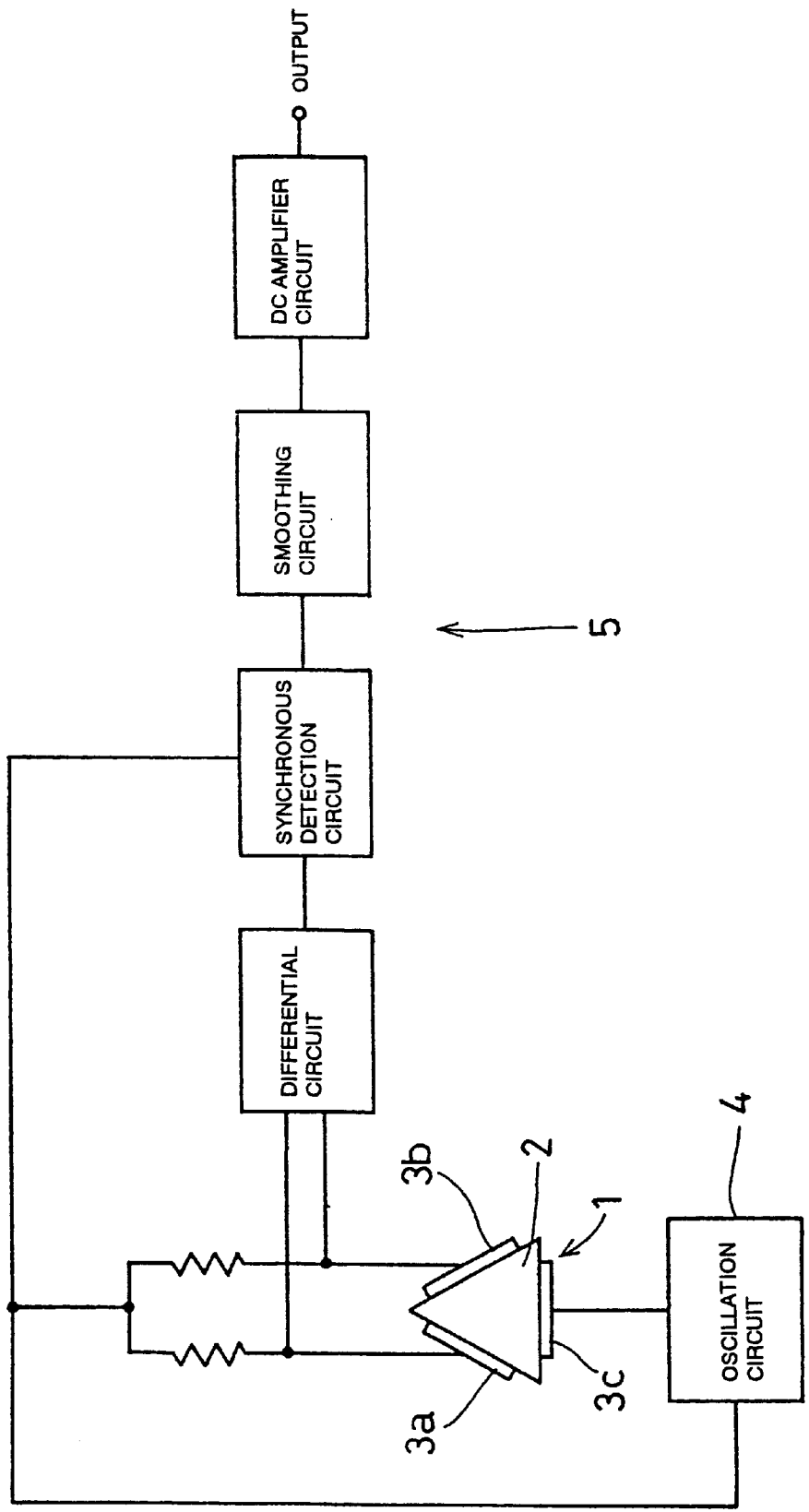
FIG. 2 is a block diagram showing a circuit for using the conventional vibrating gyroscope shown in FIG. 1.
Figure 3:
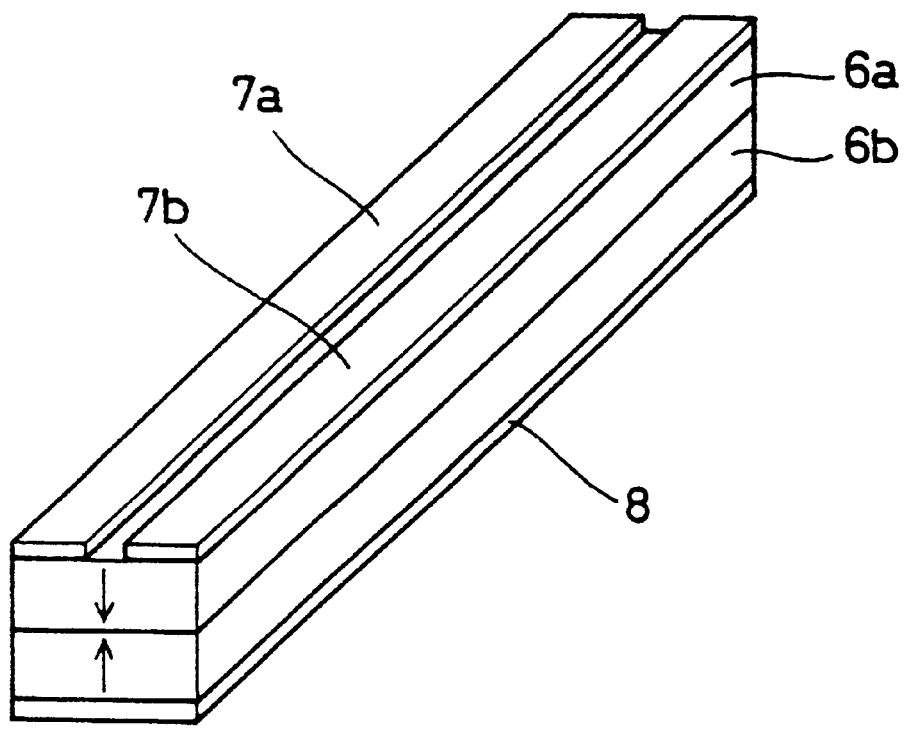
FIG. 3 is a perspective view showing another example of a conventional vibrating gyroscope.

The center member 12, the vibrating arms 14a to 14d, and the weights 16a to 16d are formed for example, by bonding two piezoelectric substrates 18 and 20. As shown by the arrows in FIG. 1, the piezoelectric substrates 18 and 20 are polarized from their opposing face sides to their adjoining face sides, for instance. An electrode layer is provided over the vibrating arms 14a to 14d, and the electrode layer is divided by grooves 22, 24, and 26.

Figure 5:
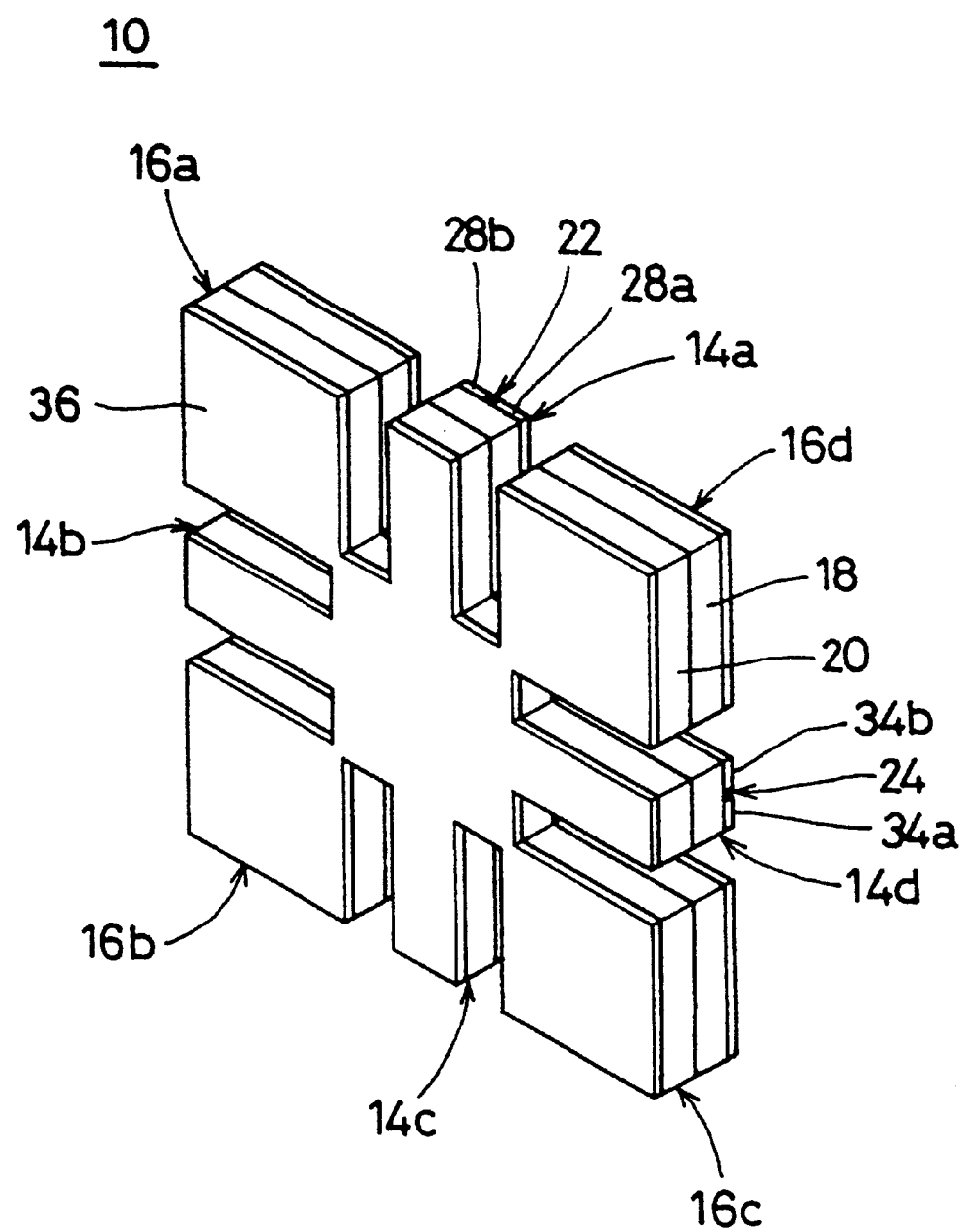
FIG. 5 is a perspective view as seen from another side of the vibrating gyroscope of FIG. 4.

The groove 22 is provided in the center portion of the width direction of the vibrating arms 14a and 14c, extending from the vibrating arm 14a to the vibrating arm 14c to form electrodes 28a and 28b on the vibrating arm 14a and electrodes 32a and 32b on the vibrating arm 14c. Furthermore, the groove 24 is provided in the center portion of the width direction of the vibrating arms 14b and 14d, extending from the vibrating arm 14b to the vibrating arm 14d to form electrodes 30a and 30b on the vibrating arm 14b and electrodes 34a and 34b on the vibrating arm 14d. Moreover, the groove 26 is provided inside the center member 12, dividing the vibrating arms 14a to 14d. Then, the electrodes 28a and 28b on the vibrating arm 14a, the electrodes 30a and 30b on the vibrating arm 14b, and the electrodes 32a and 32b on the vibrating arm 14c, and the electrodes 34a and 34b on the vibrating arm 14d, which are partitioned by the grooves 22, 24, and 26, are used for signal input/output. Moreover, an electrode 36 is provided entirely over the piezoelectric substrate 20, as shown in FIG. 5. The piezoelectric substrates and electrodes provided on the vibrating arms 14a to 14d form excitation and detection element. By utilizing a manufacturing method described later, an electrode is also provided on the weights 16a to 16d, but this electrode is unrelated to the operation of the vibrating gyroscope 10.

Figure 6:
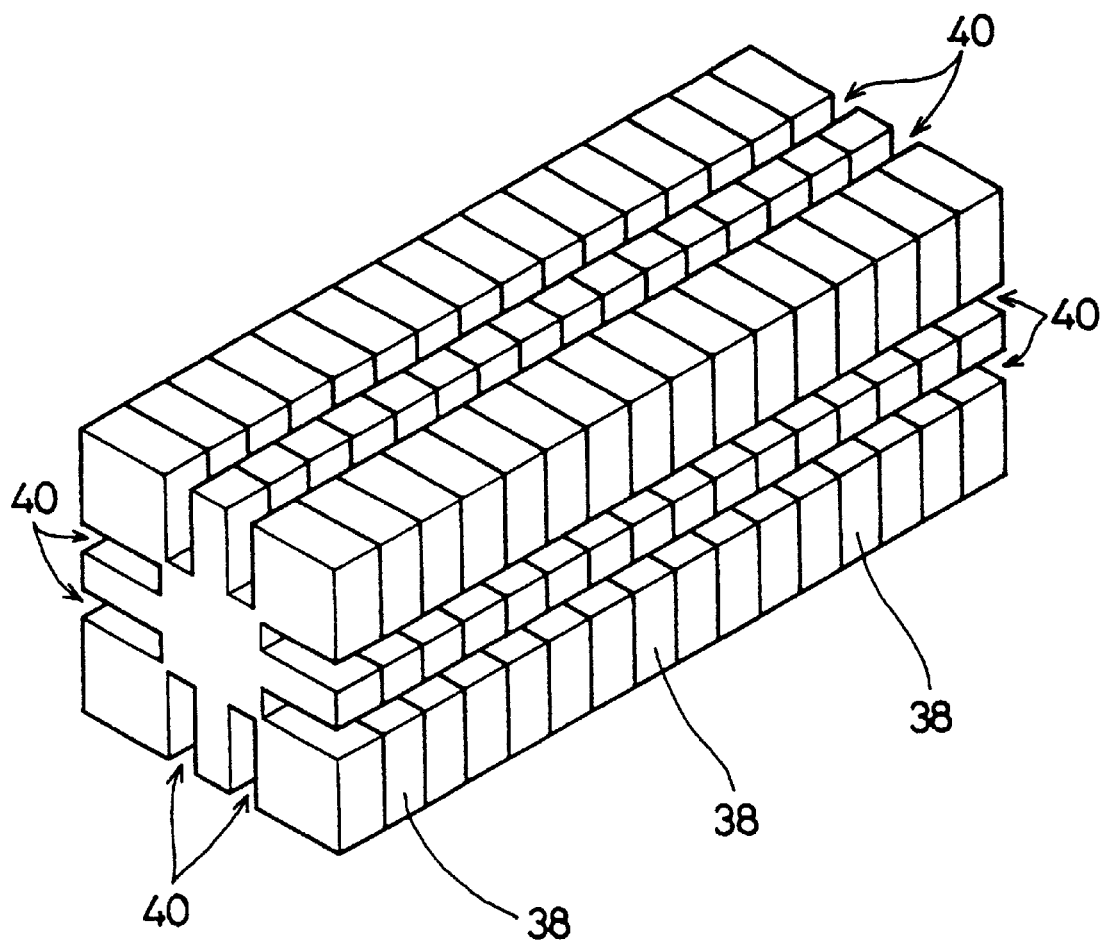
FIG. 6 is a diagrammatic view showing a method of manufacturing the vibrating gyroscope of FIG. 4.

To manufacture such a vibrating gyroscope 10, two piezoelectric substrates 18 and 20 are joined, as for instance shown in FIG. 6, multiple original plates 38 with electrode layers on both sides are piled up, fixed with hooks or the like, and notches 40 are formed using a dicer or the like. The notches 40 are to form the vibrating arms 14a to 14d and the weights 16a to 16d. Then, the vibrating gyroscope 10 is made by providing the grooves 22, 24, and 26 in the electrode layer on one face of each of the original plates 38 with notches 40 provided therein. The electrode layers other than the electrode layer on the vibrating arms 14a to 14d may be removed by etching or the like. At this time, etching is carried out so that the electrode layers on the vibrating arms 14a to 14d are divided into two. In this case, the grooves 22, 24, and 26 are formed by the etching. Further, as long as electrodes for signal input/output are provided on the vibrating arms 14a to 14d, there is no need to provide electrodes in the other portions.

Figure 7:
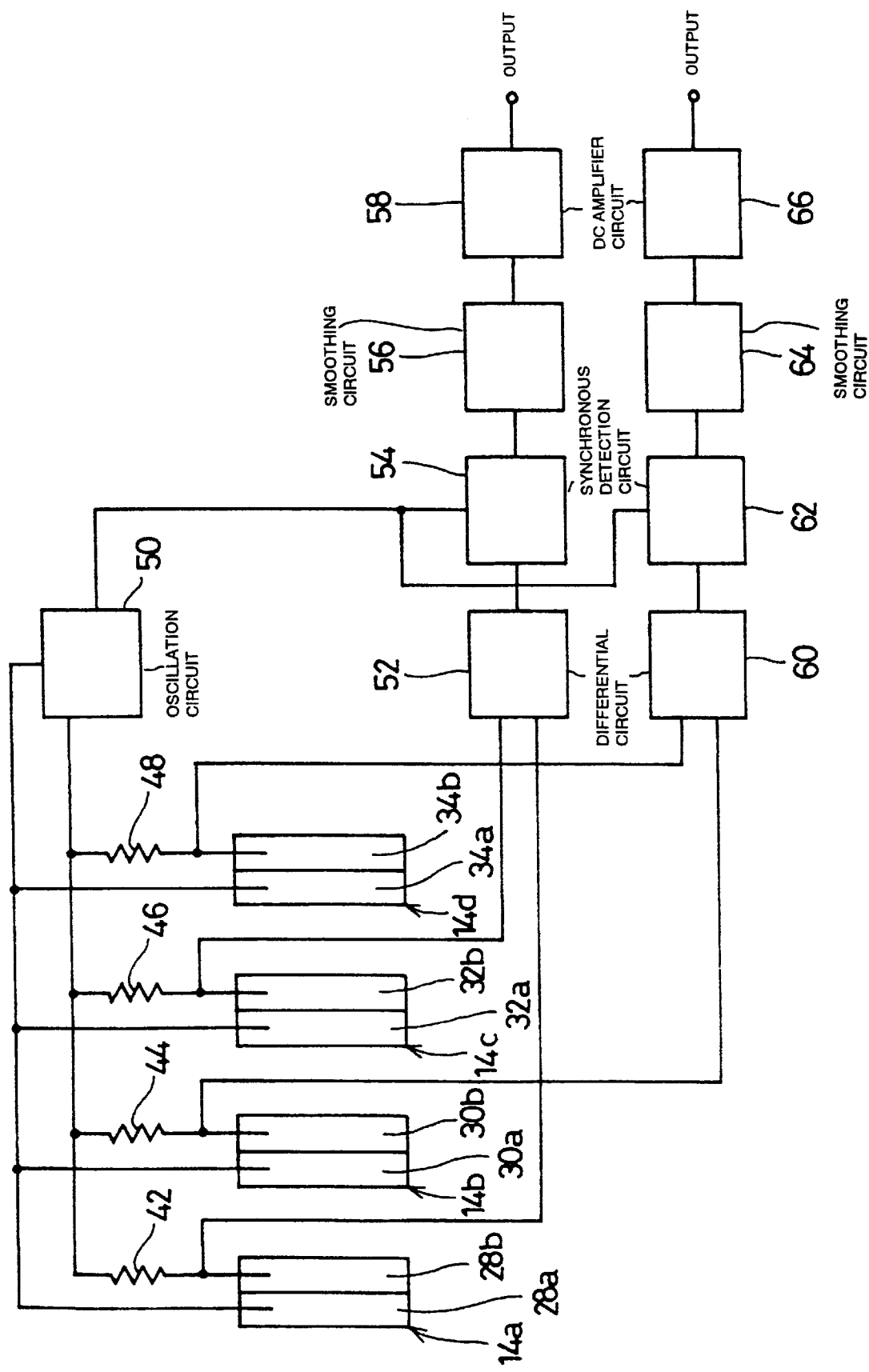
FIG. 7 is a block diagram showing a circuit for using the vibrating gyroscope shown in FIG. 4.

A circuit such as that shown in FIG. 7 is utilized to use the vibrating gyroscope 10. In FIG. 7, to facilitate understanding of the connection relationships, the electrodes 28a, 28b, 30a, 30b, 32a, 32b, 34a, and 34b of the vibrating arms 14a to 14d, are displayed in a row. The entire-face electrode 36 provided on the piezoelectric substrate 20 is connected to a reference potential (not shown).

Resistors 42, 44, 46, and 48 are connected to the electrodes 28b, 30b, 32b, and 34b of the vibrating arms 14a to 14d. An oscillation circuit 50 is connected between the resistors 42, 44, 46, and 48 and the electrodes 28a, 30a, 32a, and 34a. Moreover, the electrodes 28b and 32b of the vibrating arms 14a and 14c connect to a differential circuit 52, and the differential circuit 52 connects to a synchronous detection circuit 54. Moreover, the synchronous detection circuit 54 connects to a smoothing circuit 56, and the smoothing circuit 56 connects to a dc amplifier circuit 58. Similarly, the electrodes 30b and 34b of the vibrating arms 14b and 14d connect to a differential circuit 60, and the differential circuit 60 connects to a synchronous detection circuit 62. Moreover, the synchronous detection circuit 62 connects to a smoothing circuit 64, and the smoothing circuit 64 connects to a dc amplifier circuit 66.

Figure 8:
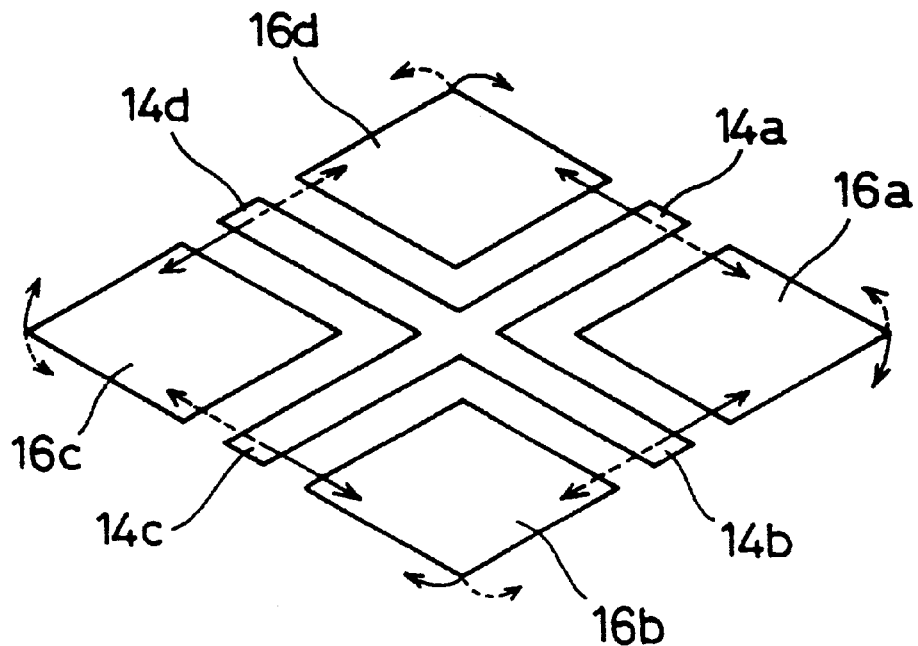
FIG. 8 is a diagrammatic view showing an analysis of the vibrating movement when the vibrating gyroscope of FIG. 4 is vibrating without an angular velocity being applied thereto.

Signals output from the electrodes 28a, 30a, 32a, and 34a of the vibrating arms 14a to 14d are fed back to the oscillation circuit 50. The fed back signal is amplified by the oscillation circuit 50, and phase-adjusted to form an excitation signal. The excitation signal is applied to the electrodes 28b, 30b, 32b, and 34b of the vibrating arms 14a to 14d. Consequently, the vibrating arms 14a to 14d vibrate under a bending mode within the same plane, as shown by the arrows of unbroken lines and dotted lines in FIG. 8. At this time, the vibrating arms 14a to 14d vibrate in the same rotation direction, and consequently a force acts on the vibrating gyroscope 10 in the rotation direction around the center of the radial arrangement. However, the weights 16a to 16d vibrate in a direction that cancels the rotational force generated by the vibration of the vibrating arms 14a to 14d, so that no rotational force acts on the vibrating gyroscope 10 as a whole.

At this time, the bending state of the vibrating arms 14a to 14d is identical, and therefore the signals output from the electrodes 28b, 30b, 32b, and 34b are identical. For this reason, no signals are output from the differential circuits 52 and 60. Therefore, no angular velocity is being applied to the vibrating gyroscope 10. In such a vibrating state, when the vibrating gyroscope 10 rotates around an axis running through the vibrating arm 14a and the vibrating arm 14c, a Coriolis force acts in a direction at a right angle to the vibration direction of the vibrating arms 14a and 14c and, shown in FIG. 9, changes the direction of vibration thereof. Since no Coriolis force acts in the other vibrating arms 14b and 14d, there is no change in the vibration direction of these vibrating arms 14b and 14d.

Figure 9:
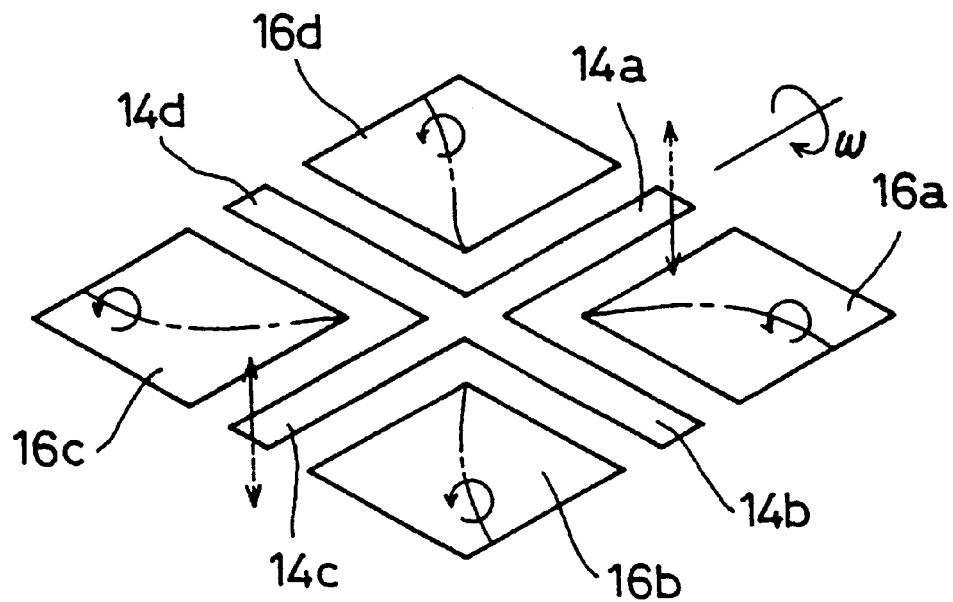
FIG. 9 is a diagrammatic view showing an analysis of the vibrating movement when an angular velocity has been applied to the vibrating gyroscope of FIG. 4.

As shown by the arrows of unbroken and dotted lines in FIG. 9, Coriolis forces in reverse directions act on the vibrating arms 14a and 14c. Consequently, the vibrating arms 14a and 14c are displaced in the reverse direction, and signals in correspondence with that displacement are output from the electrodes 28b and 32b. Therefore, the signals output from the electrodes 28b and 32b comprise signals of reverse polarity with respect to the Coriolis force. When such signals are input to the differential circuit 52, the differential circuit 52 outputs a large signal in correspondence with the Coriolis force.

The signal output from the differential circuit 52 is detected by the synchronous detection circuit 54 in synchronism with a signal from the oscillation circuit 50. As a consequence, the detected signal is the inversion of only the positive part, or only the negative part, or either one thereof, of the output signal from the differential circuit 52. The detected signal is smoothed by the smoothing circuit 56, and amplified by the dc amplifier circuit 58. The signal output from the differential circuit 52 has a level in correspondence with the Coriolis force, and consequently the level of the signal output from the dc amplifier circuit 58 is also in correspondence with the Coriolis force, enabling the size of the angular velocity to be determined from the level of the signal output from the dc amplifier circuit 58. Moreover, when the direction of the angular velocity applied to an angular velocity sensor 10 is reversed, the polarity of the signal detected by the synchronous detection circuit 54 is reversed. Consequently, the polarity of the output signal of the dc amplifier circuit 58 is also reversed, and the polarity of the output signal of the dc amplifier circuit 58 enables the direction of the angular velocity to be determined.

Furthermore, when the vibrating gyroscope 10 rotates around an axis running through the vibrating arm 14b and the vibrating arm 14d, a Coriolis force acts in a direction at a right angle to the vibration direction of the vibrating arms 14b and 14d in the same way as when the vibrating gyroscope 10 rotated around an axis running through the vibrating arms 14a and 14c. At this time, since no Coriolis force acts in the other vibrating arms 14a and 14c, there is no change in the vibration direction of these vibrating arms 14a and 14c. Therefore, the differential circuit 60, the synchronous detection circuit 62, the smoothing circuit 64, and the dc amplifier circuit 66 enable the angular velocity around the axes of the vibrating arms 14b and 14d to be determined.

In this way, this vibrating gyroscope 10 is capable of determining the angular velocity centering around two axes intersecting at right angles. Furthermore, only one oscillation circuit 50 is required to excite the basic vibration in the vibrating arms 14a to 14d, thereby enabling costs to be reduced to less than those of conventional methods using two oscillation circuits.

In the vibrating gyroscope 10 shown in FIG. 4, the center member 12, the vibrating arms 14a to 14d, and the weights 16a to 16d are formed integrally, but they may be provided separately. In this case, as for instance shown in FIG. 10, with a support 70 as the center member, the vibrating arms 14a to 14d and the weights 16a to 16d are arranged separately on the support 70 to form a vibrating gyroscope 91. Here, the same material as the vibrating arms and the weights should preferably be used as the support 70. In order to use the entire-face electrode 36 on the vibrating arms 14a to 14d, attached to the support 70, as a joint electrode, an electrode is for instance provided on all faces or the top face of the support 70, and the electrode provided on the support 70 is connected to a reference potential.

Figure 10:
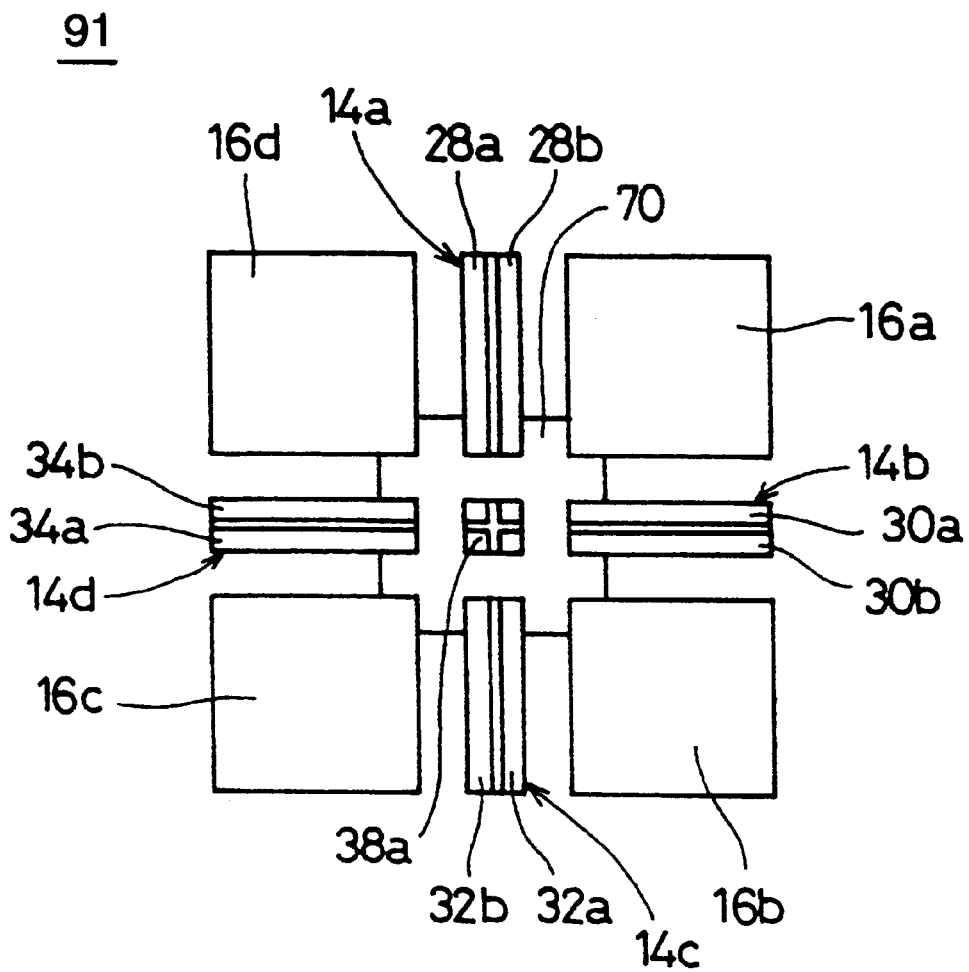
FIG. 10 is a plan view of another example of the vibrating gyroscope according to the first embodiment of the present invention.
Figure 11:
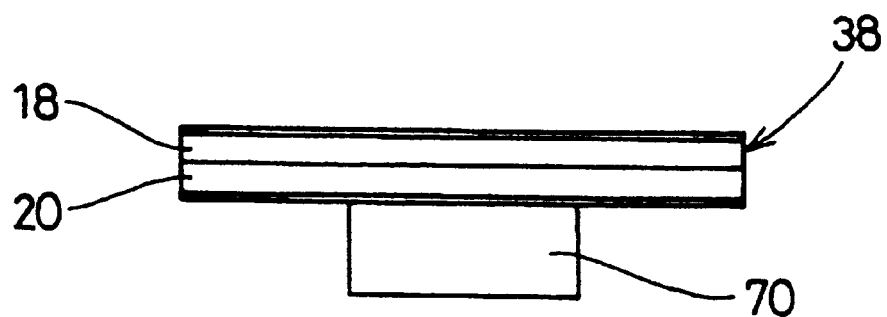
FIG. 11 is a diagrammatic view showing a method for manufacturing the vibrating gyroscope of FIG. 10.

To manufacture such a vibrating gyroscope 91, as shown in FIG. 11, an original plate 38, comprising piezoelectric substrates 18 and 20 which are bonded together and have electrode layers on both faces, is attached on top of the support 70. Then, using a dicer or the like, the original plate is cut off so that the vibrating arms 14a to 14d and the weights 16a to 16d are isolated. Moreover, by providing grooves in the electrode layers on the top faces of the vibrating arms 14a to 14d, two electrodes for excitation and detection are provided on the vibrating arms 14a to 14d. In FIG. 10, since the portions are formed by cutting off the original plate 38, the center portion 38a of the original plate 38 remains, but it is possible to determine the angular velocity using the vibrating gyroscope 10 without this center portion 38a.

Figure 12:
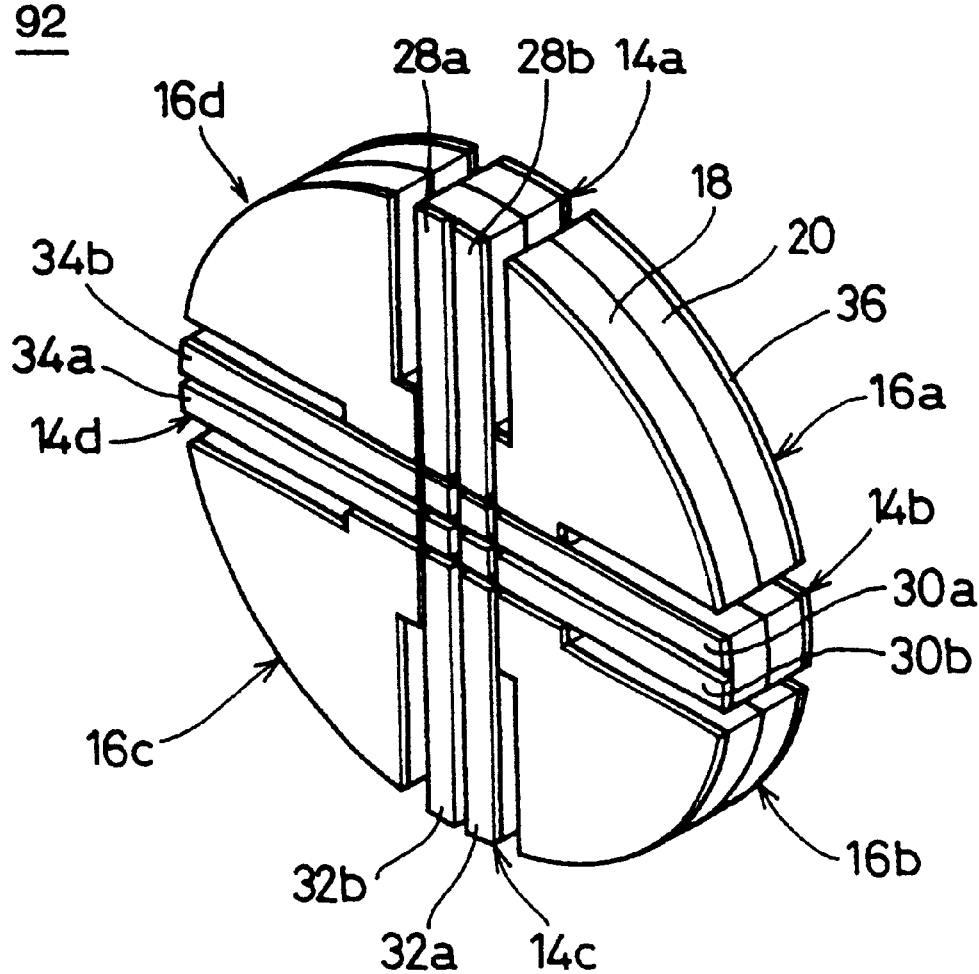
FIG. 12 is a perspective view of a modification of the vibrating gyroscope shown in FIG. 4.
Figure 13:
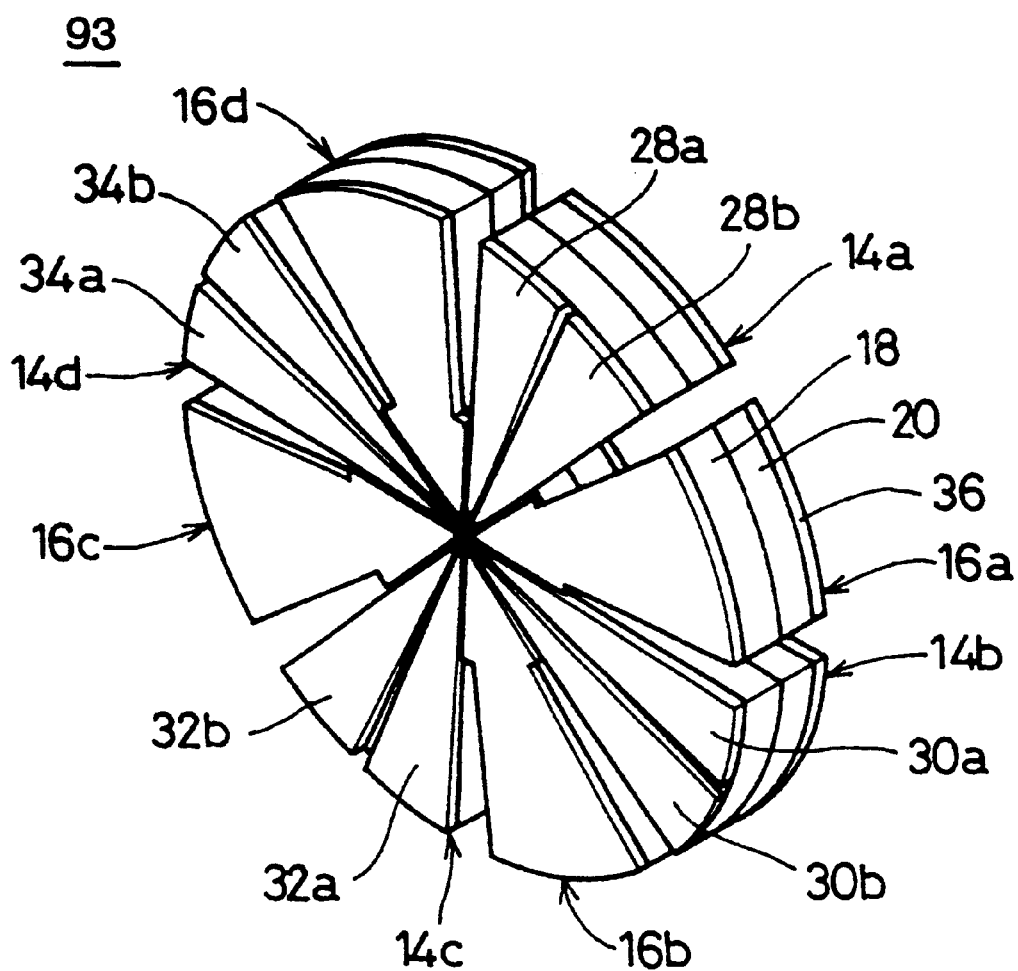
FIG. 13 is a perspective view of another modification of the vibrating gyroscope shown in FIG. 4.
Figure 14:
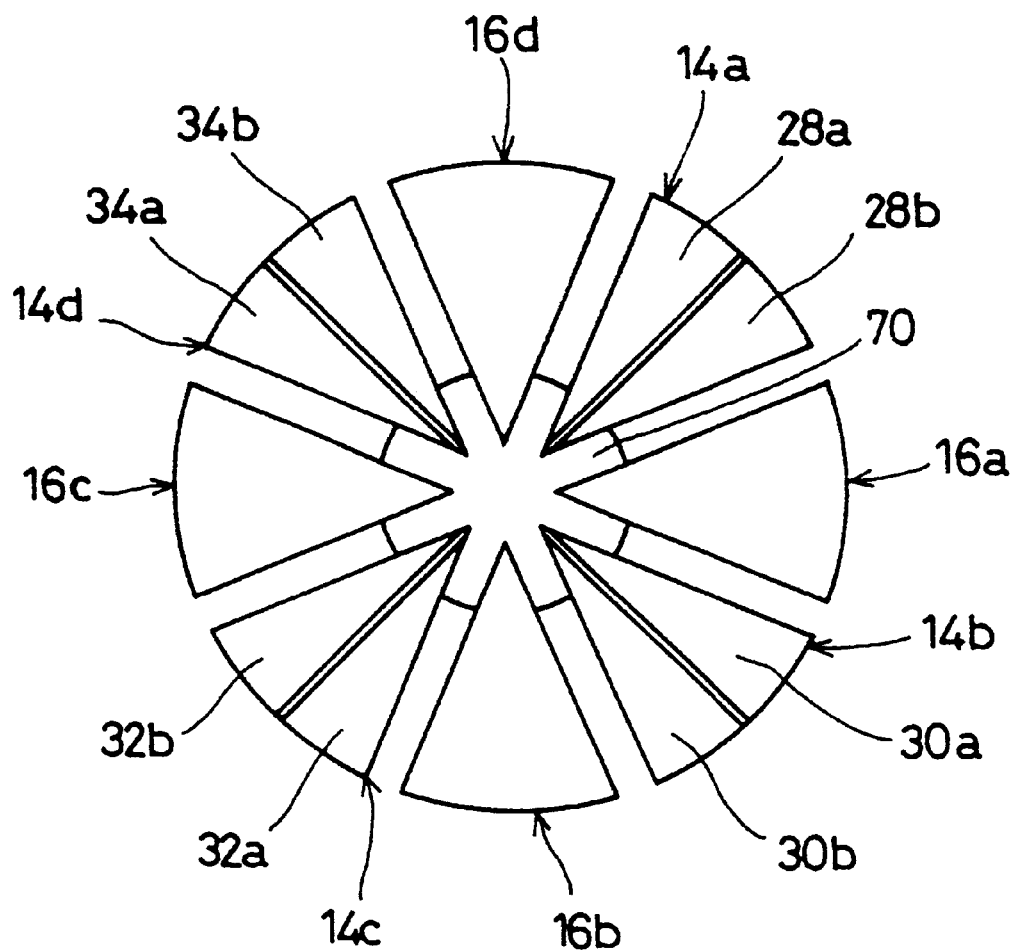
FIG. 14 is a plan view of a modification of the vibrating gyroscope of FIG. 10.

As shown in FIG. 12, the vibrating arms 14a to 14d, and the weights 16a to 16d of a vibrating gyroscope 92 may be a unitary structure having a circular disk shape. The vibrating arms 14a to 14b of the vibrating gyroscope 92 have a rectangular shape and the weights 16a to 16d thereof have a triangular or sector shape. Moreover, as shown in FIG. 13, in the case of a vibrating gyroscope 93, the vibrating arms 14a to 14d and the weights 16a to 16d may have the same sector shape. In this case, adjacent vibrating arms 14a to 14d and weights 16a to 16d are arranged at angles of 45 degrees. Furthermore, as shown in FIG. 14, sectoral vibrating arms 14a to 14d and weights 16a to 16d may be attached on a circular support to form a vibrating gyroscope 94. In this case also, as in the vibrating gyroscope 93 shown in FIG. 13, adjacent vibrating arms 14a to 14d and weights 16a to 16d are arranged at angles of 45 degrees.

Figure 15:
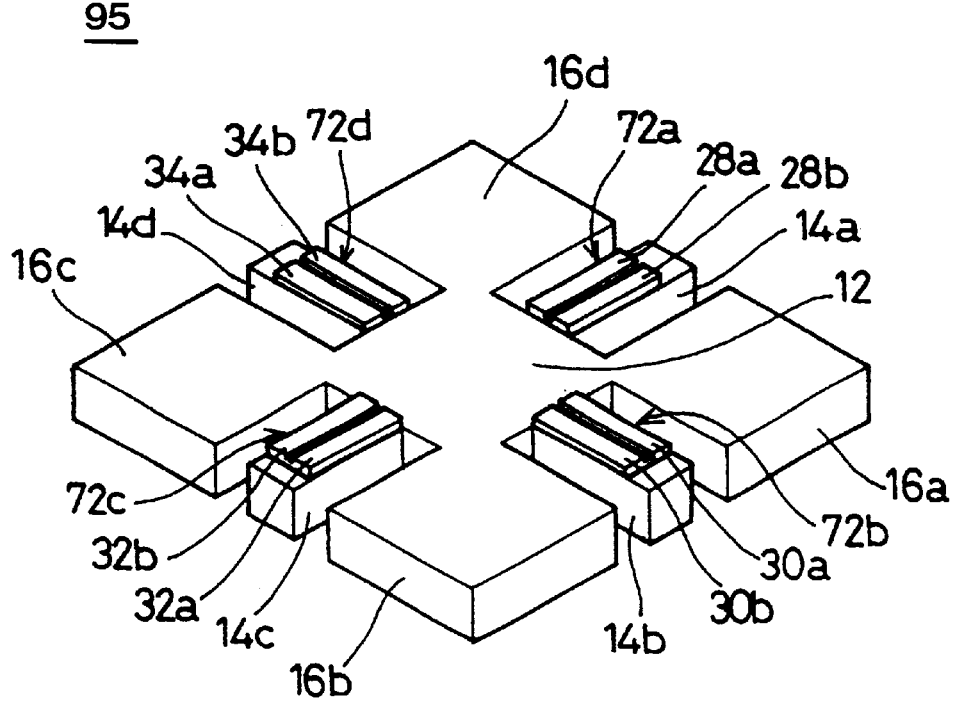
FIG. 15 is a perspective view of still another example of the vibrating gyroscope of the first embodiment of the present invention.

Moreover, the center member 12, the vibrating arms 14a to 14d, and the weights 16a to 16d can be formed integrally using a metal plate or the like to form a vibrating gyroscope 95. In this case, as shown in FIG. 15, piezoelectric elements 72a, 72b, 72c, and 72d are provided on the vibrating arms 14a to 14d. These piezoelectric elements 72a to 72d comprise electrodes, divided into two in the width direction, on the side of one face of two piezoelectric substrates polarized in the direction of their thickness, and in addition, electrodes are provided over the entire face of the other side. Then, the electrodes provided entirely over the other side face of the piezoelectric substrates are attached to the vibrating arms 14a to 14d. In such a vibrating gyroscope 96, the entire-face electrodes of the piezoelectric elements 72a to 72d are connected to a reference potential, and by using the divided electrodes for excitation and detection, the vibrating arms 14a to 14d can vibrate under a bending mode within a single plane, enabling the angular velocity to be determined using the circuit of FIG. 7.

Figure 16:
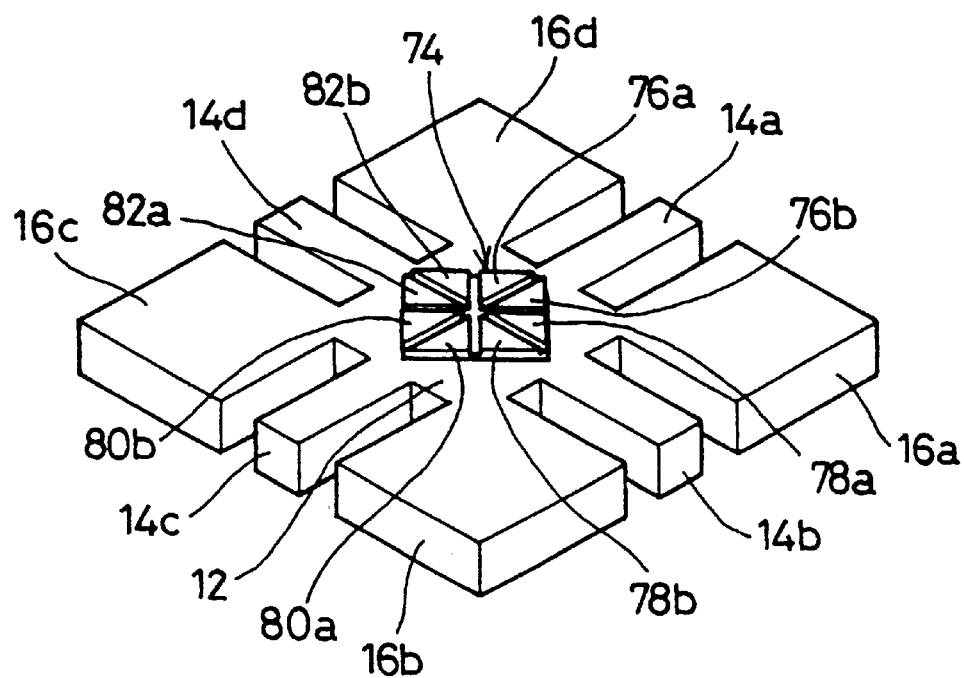
FIG. 16 is a perspective view of a modification of the vibrating gyroscope shown in FIG. 15.

Furthermore, as shown in FIG. 16, when the center member 12, the vibrating arms 14a to 14d, and the weights 16a to 16d are formed integrally together using a metal plate to form a vibrating gyroscope 96, a piezoelectric element 74 may be attached to the center member 12. This piezoelectric element 74 comprises two square-shaped piezoelectric substrates which are bonded together. An electrode layer is provided on one face of the piezoelectric element 74 and is divided into eight portions to form electrodes 76a and 76b, electrodes 78a and 78b, electrodes 80a and 80b, and electrodes 82a and 82b. Thus, the electrodes 76a, 76b, 80a, 80b, 82a and 82b are not provided on the vibrating arms 14a to 14d, but are provided in portions corresponding to the vibrating arms 14a to 14d and are used for detecting excitation of the vibrating arms 14a to 14d. In this type of vibrating gyroscope 96, by using electrodes corresponding to the vibrating arms 14a to 14d, but which are not located on the vibrating arms 14a to 14d and by using the circuit shown in FIG. 7, it is possible, as was the case with the other vibrating gyroscopes of this embodiment of the invention, to vibrate the vibrating arms 14a to 14d within a single plane and to determine the angular velocity centering around axes of two directions.

In the vibrating gyroscopes 95 and 96 using a metal plate as shown in FIG. 15 and FIG. 16, the vibrating arms 14a to 14d and the weights 16a to 16d may be formed in a sectorial shape such as those shown in FIG. 12 and FIG.

Figure 17:
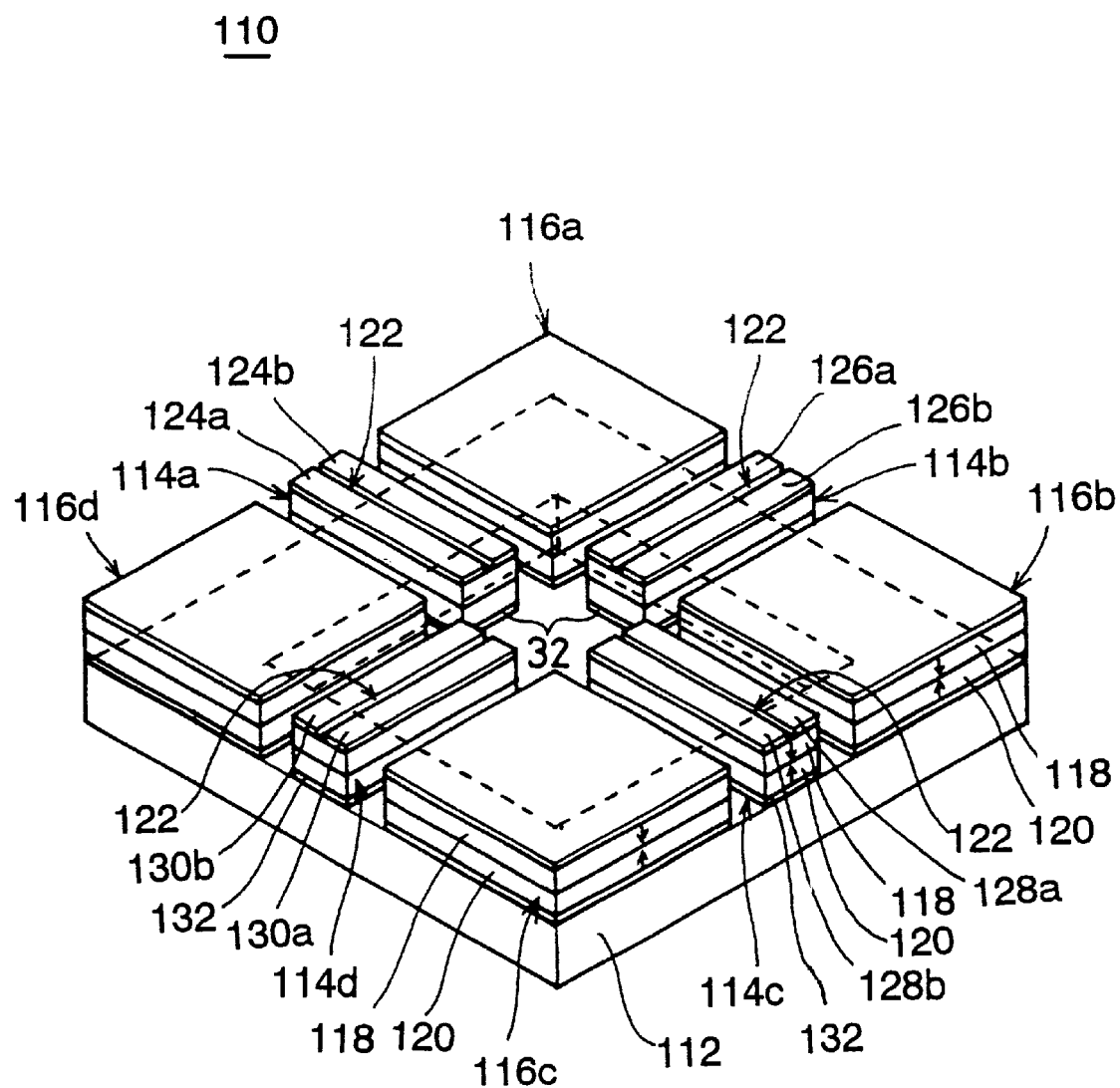
FIG. 17 is a perspective view of an example of the vibrating gyroscope according to a second embodiment of the present invention.

FIG. 17 is a perspective view of an example of the vibrating gyroscope according to a second embodiment of the present invention.

The vibrating gyroscope 110 comprises an outer frame 112 as a support. The outer frame 112 has, for instance, a rectangular frame shape having a through hole provided in its center portion. Vibrating arms 114a, 114b, 114c, and 114d each having a first end and a second end in a longitudinal direction, such as for example, a rectangular parallelepiped shape are fixed to the outer frame 112 at respective first ends thereof such that each of the vibrating arms 114a, 114b, 114c, and 114d are radially arranged with the adjacent arms making an angle of 90 degrees and extend inside of the outer frame 112. As a result, contrary to the first embodiment, the second end of the vibrating arms 114a, 114b, 114c, and 114d are arranged and can vibrate on the inside of the radial arrangement with respect to the first end thereof.

Moreover, weights 116a, 116b, 116c, and 16d, having for instance, a square plane shape, are provided between the four vibrating arms 114a to 114d, respectively. The weights 116a to 116d are also fixed to the outer frame 112 so as to be arranged radially. In this preferred embodiment, the outer frame 112, the vibrating arms 114a to 114d, and the weights 116a to 116d, are integrally formed.

The vibrating arms 114a to 114d, and the weights 116a to 116d, are provided by for instance joining two piezoelectric substrates 118 and 120. As shown by the arrows in FIG. 17, the piezoelectric substrates 118 and 120 are polarized from their opposing face sides to their join face sides, for instance. Electrode layers are, for instance, provided over the vibrating arms 114a to 144d, and the electrode layers are divided by grooves 122.

The grooves 122 are provided in the center portion of the width direction of the vibrating arms 114a to 114d, and divide the electrode layer. In this way, the electrodes 124a and 124b are provided on the vibrating arm 114a, the electrodes 126a and 126b are provided on the vibrating arm 114b, the electrodes 128a and 128b are provided on the vibrating arm 114c, and the electrodes 130a and 130b are provided on the vibrating arm 14d. Then, the electrodes 124a, 124b, 126a, 126b, 128a, 128b, 130a, and 130b, are used for signal input/output. Moreover, an electrode 132 is provided entirely over the piezoelectric substrate 120, forming the vibrating arms 114a to 114d and the weights 116a to 116d. The piezoelectric substrates and electrodes provided on the vibrating arms 114a to 114d form excitation and detection element. By utilizing a manufacturing method described later, an electrode layer is also provided on both faces of the weights 116a to 116d, but this electrode is unrelated to the operation of the vibrating gyroscope 110.

Figure 18:
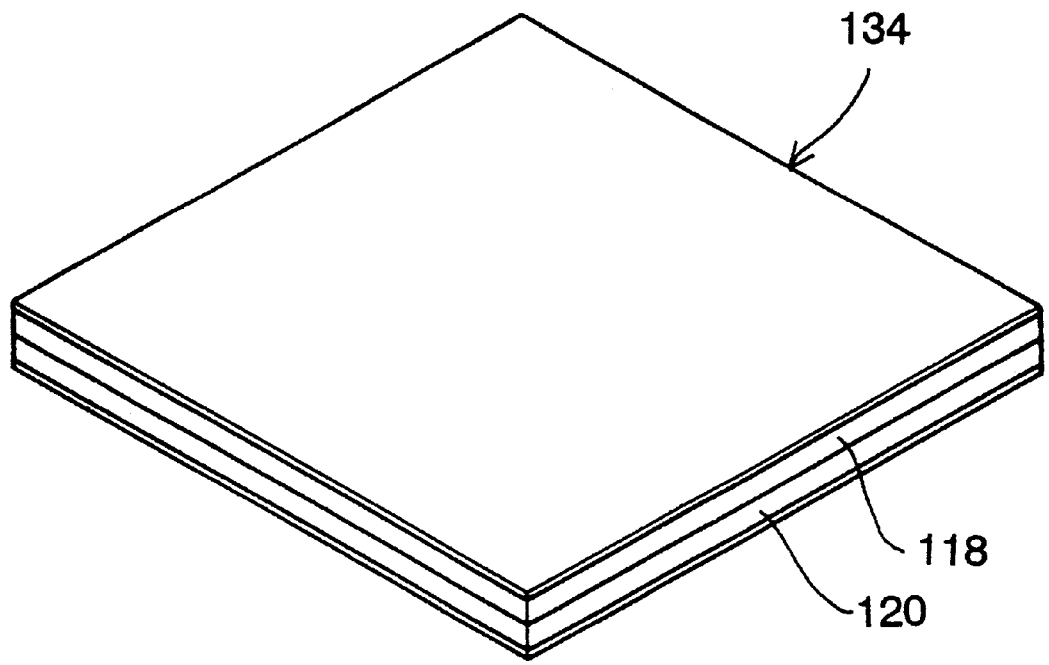
FIG. 18 is a diagrammatic view showing a method of manufacturing the vibrating gyroscope of FIG. 17.

To manufacture such a vibrating gyroscope 110, two piezoelectric substrates 118 and 120 are joined, as for instance shown in FIG. 18, an original plate 134 with electrode layers on both sides is prepared. Then, the original plate 134 is attached on the outer frame 112 having the same external dimensions as the original plate 134. Then, a dicer or the like is used to provide notches parallel to the side of the original plate 134 and intersecting the original plate 134. The notches remove the center portion of the original plate 134, and form the vibrating arms 114a to 114d and the weights 16a to 16d. Then, the vibrating gyroscope 110 is made by providing the grooves 122 in the electrode layers on one face of the vibrating arms 114a to 114d with the notches provided therein. Etching is carried out so that the electrode layers on the vibrating arms 114a to 114d are divided, and in this case, since leaving the electrode layers on the weights 116a to 116d does not adversely affect operation of the vibrating gyroscope 110, the electrode layers are not removed from the weights 116a to 116d.

Figure 19:
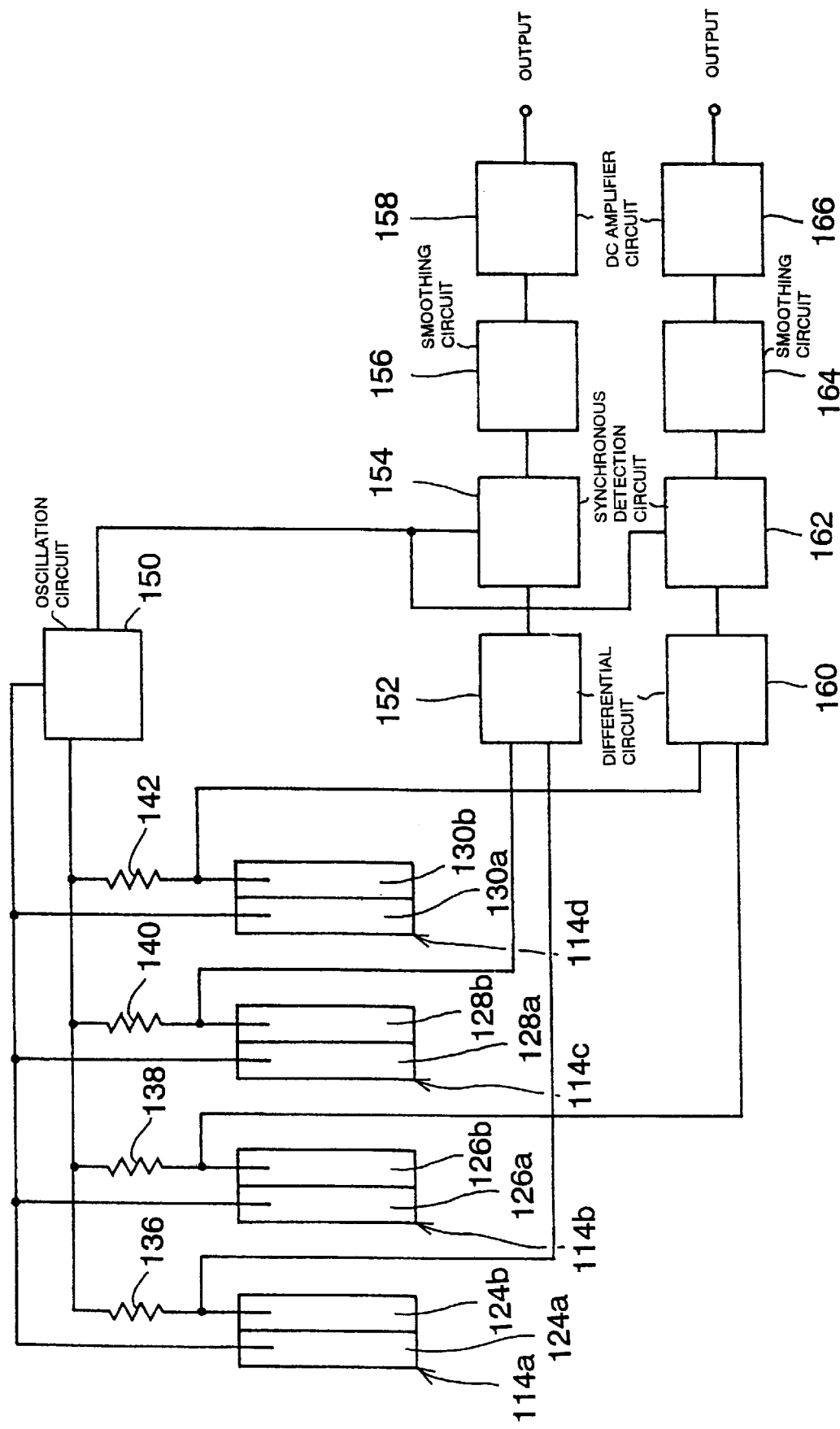
FIG. 19 is a block diagram showing a circuit for using the vibrating gyroscope shown in FIG. 17.

A circuit such as that shown in FIG. 19 is utilized to use the vibrating gyroscope 110. In FIG. 19 to facilitate understanding of the connection relationships, the electrodes 124a, 124b, 126a, 126b, 128a, 128b, 130a, and 130b of the vibrating arms 114a to 114d, are displayed in a row. The entire-face electrode 132 provided on the vibrating arms 114a to 114d is connected to a reference potential (not shown). In this case, electrodes can be provided on the entire faces or the top face of the outer frame 112, and the entire-face electrode 132 of the vibrating arms 114a to 114d can be connected to the electrode of the outer frame 113. Then, by connecting the electrode provided on the outer frame 112 to the reference potential, the entire-face electrode of the vibrating arms 114a to 114d can be connected to the reference potential.

Moreover, resistors 136, 138, 140, and 142 are connected to the electrodes 124b, 126b, 128b, and 130b of the vibrating arms 114a to 114d. An oscillation circuit 150 is connected between the resistors 136, 138, 140, and 142 and the electrodes 124a, 126a, 128a, and 130a. Moreover, the electrodes 124b and 128b of the vibrating arms 114a and 114c connect to a differential circuit 152, and the differential circuit 152 connects to a synchronous detection circuit 154. Moreover, the synchronous detection circuit 154 connects to a smoothing circuit 156, and the smoothing circuit 156 connects to a dc amplifier circuit 158. Similarly, the electrodes 126b and 130b of the vibrating arms 114b and 114d connect to a differential circuit 160, and the differential circuit 160 connects to a synchronous detection circuit 162. Moreover, the synchronous detection circuit 162 connects to a smoothing circuit 164, and the smoothing circuit 164 connects to a dc amplifier circuit 166.

Figure 20:
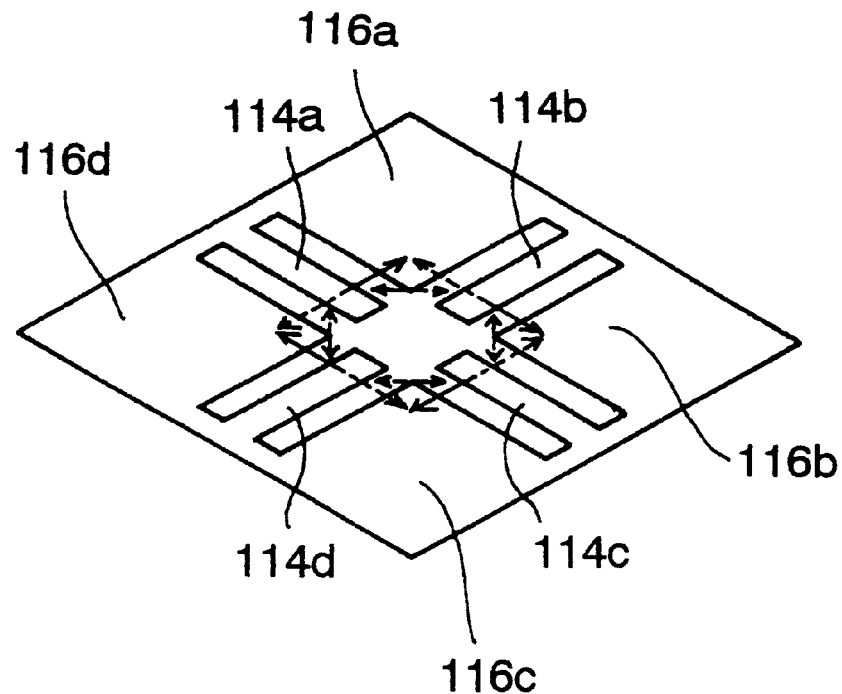
FIG. 20 is a diagrammatic view showing an analysis of the vibrating movement when the vibrating gyroscope of FIG. 17 is vibrating without an angular velocity being applied thereto.

Signals output from the electrodes 124a, 126a, 128a, and 130a of the vibrating arms 114a to 114d are fed back to the oscillation circuit 150. The fed back signal is amplified by the oscillation circuit 150, and phase-adjusted to form an excitation signal. The excitation signal is applied to the electrodes 124b, 126b, 128b, and 130b of the vibrating arms 114a to 114d. Consequently, the vibrating arms 114a to 114d vibrate under a bending mode in the same plane, as shown by the arrows of unbroken lines and dotted lines in FIG. 20. At this time, the vibrating arms 114a to 114d vibrate in the same rotation direction, and consequently a force acts on the vibrating gyroscope 110 in the rotation direction around the center of radial arrangement. However, the weights 116a to 116d vibrate in a direction that cancels the rotational force generated by the vibration of the vibrating arms 114a to 114d, so that no rotational force acts on the vibrating gyroscope 110 as a whole.

Figure 21:
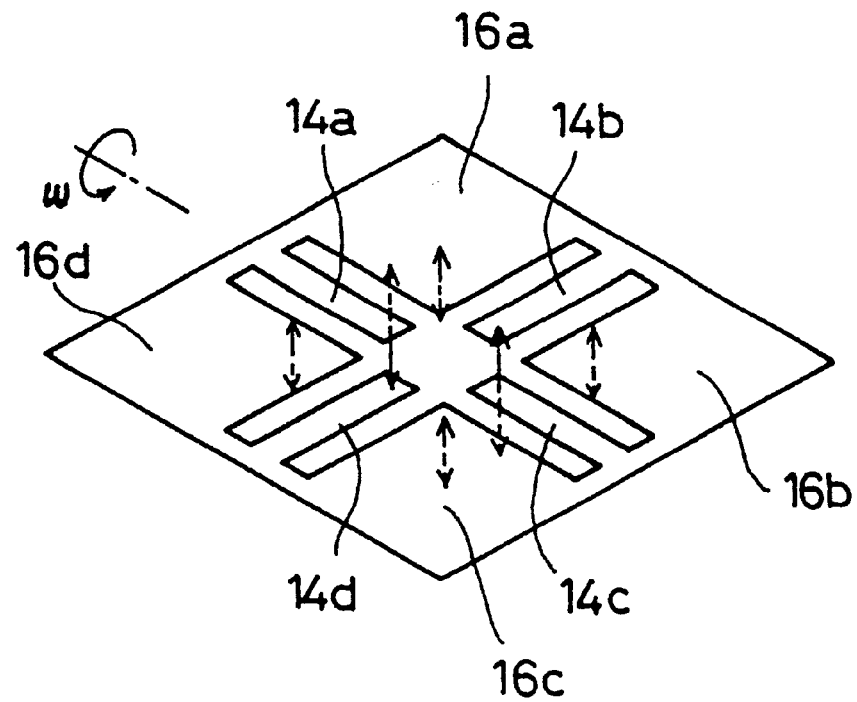
FIG. 21 is a diagrammatic view showing an analysis of the vibrating movement when an angular velocity has been applied to the vibrating gyroscope of FIG. 17.

At this time, the bending state of the vibrating arms 114a to 114d is identical, and therefore the signals output from the electrodes 124b, 126b, 128b, and 130b are identical. For this reason, no signals are output from the differential circuits 152 and 160. Therefore, no angular velocity is being applied to the vibrating gyroscope 110. In such a vibrating state, when the vibrating gyroscope 110 rotates around an axis running through the vibrating arm 14a and the vibrating arm 114c, a Coriolis force acts in a direction at a right angle to the vibration direction of the vibrating arms 114a and 114c and, as shown in FIG. 21, changes the direction of vibration thereof. Since no Coriolis force acts in the other vibrating arms 114b and 114d, there is no change in the vibration direction of these vibrating arms 114b and 114d.

As shown by the arrows of unbroken and dotted lines in FIG. 21, Coriolis forces in reverse directions act on the vibrating arms 114a and 114c. Consequently, the vibrating arms 114a and 114c are displaced in the reverse direction, and signals in correspondence with that displacement are output from the electrodes 124b and 128b. Therefore, the signals output from the electrodes 124b and 128b comprise signals of reverse polarity with respect to the Coriolis force. When such signals are input to the differential circuit 152, the differential circuit 152 outputs a large signal in correspondence with the Coriolis force.

The signal output from the differential circuit 152 is detected by the synchronous detection circuit 154 in synchronism with a signal from the oscillation circuit 150. As a consequence, the detected signal is the inversion of only the positive part, or only the negative part, or either one thereof, of the output signal from the differential circuit 152. The detected signal is smoothed by the smoothing circuit 156, and amplified by the dc amplifier circuit 158. The signal output from the differential circuit 152 has a level in correspondence with the Coriolis force, and consequently the level of the signal output from the dc amplifier circuit 158 is also in correspondence with the Coriolis force, enabling the size of the angular velocity to be determined from the level of the signal output from the dc amplifier circuit 158. Moreover, when the direction of the angular velocity applied to an angular velocity sensor 110 is reversed, the polarity of the signal detected by the synchronous detection circuit 154 is reversed. Consequently, the polarity of the output signal of the dc amplifier circuit 158 is also reversed, and the polarity of the output signal of the dc amplifier circuit 158 enables the direction of the angular velocity to be determined.

Furthermore, when the vibrating gyroscope 110 rotates around an axis running through the vibrating arm 114b and the vibrating arm 114d, a Coriolis force acts in a direction at a right angle to the vibration direction of the vibrating arms 114b and 114d in the same way as when the vibrating gyroscope 110 rotated around an axis running through the vibrating arms 114a and 114c. At this time, since no Coriolis force acts in the other vibrating arms 114a and 114c, there is no change in the vibration direction of these vibrating arms 114a and 114c. Therefore, the differential circuit 160, the synchronous detection circuit 162, the smoothing circuit 164, and the dc amplifier circuit 166 enable the angular velocity around the axes of the vibrating arms 114b and 114d to be determined.

In this way, this vibrating gyroscope 110 is capable of determining the angular velocity centering around two axes intersecting at right angles. Furthermore, only one oscillation circuit 150 is required to excite the basic vibration in the vibrating arms 114a to 114d, thereby enabling costs to be reduced to less than those of conventional methods using two oscillation circuits.

Figure 22:
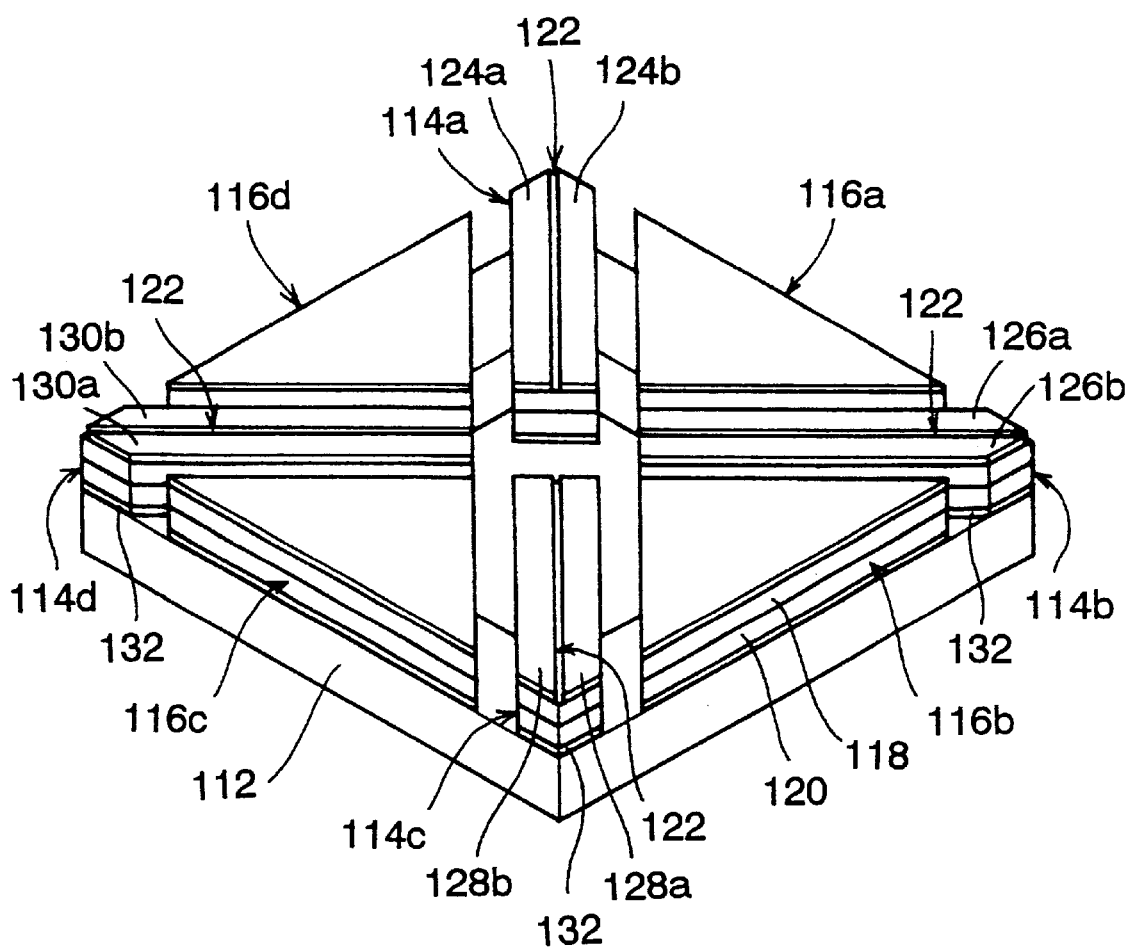
FIG. 22 is a plan view of another example of the vibrating gyroscope according to the second embodiment of the present invention.

As shown in FIG. 22, by making the cut direction of the original plate 134 attached on the outer framel 112 a diagonal line direction through the outer frame 112, the length of the vibrating arms 114a to 114d can be increased. By lengthening the vibrating arms 114a to 114d in this way, the amplitude of the vibrating arms 114a to 114d can be increased, increasing the signal corresponding to the Coriolis force. Therefore, the detection sensitivity of angular velocity can be increased.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A vibrating gyroscope comprising:

a support;

four vibrating arms each having a first end and a second end in a longitudinal direction, the four vibrating arms being fixed to the support at the respective first ends in the longitudinal direction such that four vibrating arms are arranged in a radial arrangement in a single plane with the adjacent arms making an angle of about 90 degrees;

four weights fixed to the support so as to be arranged radially between the respective adjacent vibrating arms; and excitation and detection elements for vibrating the vibrating arms under a bending mode within the single plane and for outputting signals generated by the vibration of the vibrating arms.

2. The vibrating gyroscope according to claim 1, wherein the second end of each vibrating arm is arranged on an outside of the radial arrangement with respect to the first end of the corresponding vibrating arm.

3. The vibrating gyroscope according to claim 2, wherein the vibrating arms and the weights are each formed of a piezoelectric material, and the excitation and detection elements comprise electrodes provided on the vibrating arms.

4. The vibrating gyroscope according to claim 3, wherein there are two electrodes on each vibrating arm.

5. The vibrating gyroscope according to claim 3, wherein the support, the vibrating arms and the weights comprise a unitary structure formed of a piezoelectric material, and the excitation and detection elements comprise electrodes provided on the vibrating arms.

6. The vibrating gyroscope according to claim 5, wherein each of the vibrating arms comprises two piezoelectric layers polarized in opposite directions.

7. The vibrating gyroscope according to claim 3, wherein the second ends of the vibrating arms define an outer periphery of the radial arrangement which is substantially circular.

8. The vibrating gyroscope according to claim 7, wherein the vibrating arms are rectangularly shaped and the weights are triangularly shaped.

9. The vibrating gyroscope according to claim 7, wherein the vibrating arms and the weights are triangularly shaped.

10. The vibrating gyroscope according to claim 2, wherein the support, the vibrating arms, and the weights are formed integrally with a metal plate, and the excitation and detection elements comprise piezoelectric elements provided on the metal plate.

11. The vibrating gyroscope according to claim 1, wherein the second end of each vibrating arm is arranged on an inside of the radial arrangement with respect to the first end of the corresponding vibrating arm.

12. The vibrating gyroscope according to claim 11, wherein the vibrating arms and the weights are formed of a piezoelectric material, and the excitation and detection elements comprise electrodes provided on the vibrating arms.

13. The vibrating gyroscope according to claim 12, wherein there are two electrodes on each vibrating arm.

14. The vibrating gyroscope according to claim 12, wherein each of the vibrating arms comprises two piezoelectric layers polarized inn opposite directions.

15. The vibrating gyroscope according to claim 1, wherein the vibrating arms are structured and arranged to vibrate the single plane in a center of the radial arrangement.

16. The vibrating gyroscope according to claim 15, wherein the weights are structured and arranged to vibrate in a direction reverse to the direction in which the vibrating arms vibrate so as to cancel the vibration of the vibrating arms.

* * * * *